United States Patent
Zhang et al.

(10) Patent No.: US 10,746,756 B2
(45) Date of Patent: Aug. 18, 2020

(54) DYNAMIC TESTING DEVICE SUITABLE FOR DRILLING TOOL ATTITUDE MEASUREMENT MODULE

(71) Applicant: INSTITUTE OF GEOLOGY AND GEOPHYSICS CHINESE ACADEMY OF SCIENCES, Beijing (CN)

(72) Inventors: Wenxiu Zhang, Beijing (CN); Yongyou Yang, Beijing (CN); Jian Zheng, Beijing (CN); Yuntao Sun, Beijing (CN); Qingyun Di, Beijing (CN); Wenxuan Chen, Beijing (CN); Changchun Yang, Beijing (CN)

(73) Assignee: INSTITUTE OF GEOLOGY AND GEOPHYSICS CHINESE ACADEMY OF SCIENCES, Beijing (CN)

( * ) Notice: Subject to any disclaimer, the term of this patent is extended or adjusted under 35 U.S.C. 154(b) by 136 days.

(21) Appl. No.: 16/133,241

(22) Filed: Sep. 17, 2018

(65) Prior Publication Data
US 2019/0086439 A1 Mar. 21, 2019

(51) Int. Cl.
*G01P 3/00* (2006.01)
*E21B 44/00* (2006.01)
(Continued)

(52) U.S. Cl.
CPC ............ *G01P 3/00* (2013.01); *E21B 7/00* (2013.01); *E21B 7/04* (2013.01); *E21B 44/00* (2013.01); *G01P 3/486* (2013.01)

(58) Field of Classification Search
CPC .................................................. G01P 21/00
See application file for complete search history.

(56) References Cited

U.S. PATENT DOCUMENTS

| 1,560,435 A | * | 11/1925 | Sperry | ............... G01C 25/005 73/1.76 |
| 2,761,306 A | * | 9/1956 | McNutt | ............... G01C 25/005 73/1.78 |

(Continued)

FOREIGN PATENT DOCUMENTS

CN 204924260 U * 12/2015

OTHER PUBLICATIONS

English Translation of CN-204924260-U (Year: 2015).*

*Primary Examiner* — Alexander A Mercado
(74) *Attorney, Agent, or Firm* — Platinum Intellectual Property LLP

(57) ABSTRACT

The disclosure relates to the field of drilling tool attitude measurement, and particularly to a dynamic testing device suitable for a drilling tool attitude measurement module. The dynamic testing device may comprise a test fixture for attitude measurement module, an azimuth rotation device for adjusting an azimuth angle, an inclination angle swing device for adjusting an inclination angle, and a toolface angle rotation device for driving the test fixture for attitude measurement module to rotate, and a rotation speed measurement device for measuring a rotation speed and a self-rotation angle of the test fixture for attitude measurement module in a rotating state. The testing device has characteristics of large bearing weight, high rotation speed which is measurable and controllable, convenient for mounting and fixing a tested module, etc. It can simulate conditions of downhole rotation of a drilling tool, and be used for dynamic testing of the attitude measurement module.

9 Claims, 3 Drawing Sheets

(51) Int. Cl.
    *E21B 7/04*      (2006.01)
    *E21B 7/00*      (2006.01)
    *G01P 3/486*     (2006.01)

(56) References Cited

U.S. PATENT DOCUMENTS

| | | | | |
|---|---|---|---|---|
| 3,164,978 | A * | 1/1965 | Sharman | G01C 25/005 |
| | | | | 73/1.77 |
| 3,584,513 | A * | 6/1971 | Gates | G01C 19/02 |
| | | | | 74/5.34 |
| 3,612,699 | A * | 10/1971 | Asano | B64G 7/00 |
| | | | | 356/147 |
| 4,302,962 | A * | 12/1981 | Williams | G01C 25/00 |
| | | | | 248/188.4 |
| 5,210,954 | A * | 5/1993 | Schafler | G01C 9/00 |
| | | | | 33/351 |
| 2003/0084582 | A1* | 5/2003 | Singer | G01C 9/00 |
| | | | | 33/391 |
| 2006/0191148 | A1* | 8/2006 | Lippuner | G01C 1/02 |
| | | | | 33/290 |
| 2014/0157860 | A1* | 6/2014 | Tuunanen | E21B 7/025 |
| | | | | 73/1.75 |
| 2014/0350881 | A1* | 11/2014 | Hong | G01C 25/005 |
| | | | | 702/95 |
| 2015/0121989 | A1* | 5/2015 | Orzechowski | G01C 25/00 |
| | | | | 73/1.38 |
| 2016/0223357 | A1* | 8/2016 | Frey, Jr. | G01C 25/005 |

* cited by examiner

DYNAMIC TESTING DEVICE SUITABLE FOR DRILLING TOOL ATTITUDE MEASUREMENT MODULE

RELATED APPLICATIONS

This application claims a priority of Chinese Patent Application No. 201710861444.8, filed Sep. 21, 2017, the disclosure of which is hereby incorporated by reference in its entirety.

TECHNICAL FIELD

The embodiments of the present disclosure relate to the technical field of drilling tool attitude measurement, and in particular to a dynamic testing device suitable for a drilling tool attitude measurement module.

BACKGROUND OF THE INVENTION

In an oil and gas drilling process, the information about a current direction of a drill bit is critical to ensure drilling in the reservoir. Therefore, in addition to conventional drilling tool assembly, directional drilling also involves using position sensors to measure an attitude of a downhole drilling tool, providing information about an azimuth angle (an angle with the north direction in a horizontal plane) and an inclination angle (an angle with a vertical direction, also known as an inclination angle of the borehole) and a toolface angle (equivalent to a roll angle in navigation). An accurate measurement of the attitude of the downhole drilling tool not only ensures efficient drilling of an intended target, but also avoids the risk of collision with adjacent wellbore.

At present, attitude parameters of the drilling tool are generally measured by a Measurement While Drilling (MWD) system installed about 10 meters behind the drill bit. The MWD system integrates a three-axis accelerometer and a three-axis magnetometer, when an azimuth angle, an inclination angle and a toolface angle are measured, an operation of drilling must be stopped (that is, the drilling tool does not rotate), which is called a static measurement. Although accurate attitude parameters can be obtained with the MWD system, there are problems such as low time efficiency and high cost. In order to further improve a drilling efficiency, it is currently a hot research topic in the field of drilling tool attitude measurement for achieving continuous, dynamic and real-time measurement of the attitude parameters of the drilling tools.

In the research and development of a drilling tool attitude measurement module, it is necessary to build a testing device on the ground to simulate an attitude and a rotation state of the drilling tool in a well, and realize a calibration, testing and performance verification of instruments.

An existing calibration and testing device for the MWD system mainly includes a three-axis manual non-magnetic turntable and a three-axis electric non-magnetic turntable. A three-axis non-magnetic turntable and a three-axis inclinometer calibration table disclosed in patents CN202421522U and CN2015897611U both belong to manual non-magnetic turntables. When this type of turntable is used, three axial directions are all manually adjusted. According to a dial reading, when the turntable is turned to a set angle, a module to be tested is locked, and then the module is tested. This type of turntable can only be used for static calibration and testing. A three-axis non-magnetic calibration table disclosed in the patents CN103837161A and CN202017484U simply improves the mode of reading from a mechanical dial reading to a photoelectric encoder or micro camera automatic reading, and can only be used for manual static calibration and testing. Therefore, an angle adjustment of the existing manual three-axis non-magnetic turntable is manually operated, and data is read through a dial, which can only be used for a static test rather than a dynamic test at a certain rotation speed, and cannot be used for dynamic calibration test of an attitude measurement instrument.

Regarding the existing three-axis electric non-magnetic turntable, the patents CN204346451U and CN204329980U disclose technical solutions of an electric three-axis non-magnetic turntable, in which three axial directions are all electrically adjusted, but the main structure of a U-shaped support with a base is not able to operate stably under a condition of a large weight and a high rotation speed. At the same time, a toolface shaft is a hollow shaft tube, and both ends thereof are fixed by a taper sleeve nut, which is only suitable for a module having a regular round rod shape to be tested.

Therefore, in order to simulate a state of rotation of a drilling tool and realize a dynamic test of an attitude measurement module, it is necessary to develop a dynamic testing device capable of bearing large weight (above 30 kg), having a high rotation speed (maximum rotation speed up to 500 rpm) which is measurable and controllable, convenient for mounting and fixing a tested module and capable of rotating smoothly.

SUMMARY OF THE INVENTION

In order to solve the above technical problems, the present disclosure provides a dynamic testing device suitable for a drilling tool attitude measurement module. After a tested module is loaded, three attitude angles can be adjusted. The dynamic testing device adopts a main structure composed of a horizontal rotation plane and a vertical plane which are orthogonal to each other, so that the whole device has a small volume and a stable structure, and can be applied to a dynamic testing of an attitude measurement module with a larger weight. The testing device is characterized in that it has a large bearing weight (30 kg), a high rotation speed (maximum speed of 500 rpm) which is measurable and controllable, is convenient for mounting and fixing a tested module, and has a smooth rotation. It can simulate conditions of rotation of downhole drilling tools for dynamic testing of the attitude measurement module.

In an aspect of the disclosure, a dynamic testing device suitable for a drilling tool attitude measurement module is provided comprising a test fixture for attitude measurement module, an azimuth rotation device, an inclination angle swing device, a toolface angle rotation device and a rotation speed measurement device. The dynamic testing device may be capable of independently adjusting an azimuth angle, an inclination angle and a toolface angle of the test fixture for attitude measurement module, and the dynamic testing device may adopt an overall main structure composed of a horizontal rotation plane and a vertical plane which are orthogonal to each other. The azimuth rotation device may constitute a horizontal base of the dynamic testing device, for adjusting the azimuth angle. The inclination angle swing device may be configured to adjust the inclination angle, mounted on the azimuth rotation device, and rotatable with the azimuth rotation device, and an inclination angle swing plane and an azimuth rotation plane are perpendicular to each other. The toolface angle rotation device may be mounted on the inclination angle swing device, able to swing together with the inclination angle swing device, and used to drive the test fixture for attitude measurement module to rotate. The test fixture for attitude measurement module may be mounted on the toolface angle rotation device, and able to rotate under the driving of the toolface angle rotation device. The rotation speed measurement device may be mounted on the toolface angle rotation device for measuring a rotation speed and a self-rotation angle of the test fixture for attitude measurement module in a rotating state.

In some embodiments, the azimuth rotation device may adjust the azimuth angle in a range from 0° to 360°, and comprise a fixed base, a first hand wheel, a worm gear box, a main rotation shaft, a horizontal rotation table, an azimuth dial, a first cursor and a horizontal table locking device. The first hand wheel may be mounted on the fixed base, and connected to the worm gear box through a transmission shaft, and the worm gear box may be connected to the horizontal rotation table through the main rotation shaft and a nut, and the horizontal rotation table may be in contact with the fixed base through thrust bearings arranged circumferentially and evenly. The azimuth dial may be mounted on the horizontal rotation table, and the first cursor may be mounted on the fixed base, and the azimuth dial and the first cursor may cooperate for reading an azimuth rotation angle; and the horizontal table locking device may be mounted on both ends of a diameter of the horizontal rotation table for realizing a locking and fixing between the horizontal rotation table and the fixed base.

In some embodiments, the inclination angle swing device may adjust the inclination angle in a range from −90° to +90°, and comprise a vertical table, an auxiliary locking table, a swing arm, a swing arm rotation shaft, an inclination angle dial, a second cursor, a swing arm fine adjustment locking device and a clasp-locking device. The vertical table and the auxiliary locking table each may adopt a semicircular structure, and be vertically mounted on the horizontal rotation table, and a mounting direction of the vertical table and the auxiliary locking table may be parallel to a 0°-180° direction line on the azimuth dial. Gear teeth may be machined on an outer circumference of the vertical table for realizing continuous adjustment of an inclination angle of the swing arm based on gear meshing. The swing arm may be connected to the vertical table through the swing arm rotation shaft and a bearing, and the swing arm rotation shaft may be fixedly locked to the auxiliary locking table by a nut. The inclination angle dial may be mounted on the vertical table, and the second cursor may be fixed on the swing arm, and the inclination angle dial and the second cursor may cooperate to read the inclination angle; and the swing arm may be able to be locked and fixed with the auxiliary locking table by the clasp-locking device, so that the test fixture for attitude measurement module does not loose or change the inclination angle during rotation; and the swing arm may be able to be locked and fixed with the vertical table through a gear-meshing action of the swing arm fine adjustment locking device.

In some embodiments, the swing arm fine adjustment locking device may be mounted on an upper end of the swing arm, and comprise a first gear, a second gear, a third gear, a second hand wheel, a first locking screw, a fixed plate, a lever, a lever rotation shaft and an adjusting rotation shaft. A rotation shaft of the first gear may be connected to the second hand wheel, and the first gear may be meshed with the second gear, and the first gear and the second gear may be respectively mounted to the fixed plate through their respective rotation shafts; the fixed plate may be mounted to the swing arm through a screw; the adjusting rotation shaft of the third gear may be mounted in an oblong hole of the fixed plate, and the adjusting rotation shaft may be able to move within the oblong hole.

In some embodiments, one end of the lever may be connected to the fixed plate through the lever rotation shaft, and the other end thereof may be in contact with the adjusting rotation shaft of the third gear through a fork-type structure, and the lever (15-7) may be rotatable around the lever rotation shaft; the first locking screw may be mounted on the fixing plate, and one end of the first locking screw may be in contact with the lever through a spherical structure, and the first locking screw can push the lever to rotate about the lever rotation shaft, thereby pushing the adjusting rotation shaft to move left and right.

In some embodiments, when the adjusting rotation shaft is located at an end of the oblong hole of the fixed plate away from the second gear, teeth of the second gear and the third gear are disengaged from each other while the second gear and the third gear may respectively mesh with the teeth on the circumference of the vertical table, When the second hand wheel is rotated, the first gear may drive the second gear to rotate, thereby driving the swing arm to rotate around the swing arm rotation shaft, and the second gear and the vertical table have a large gear ratio of 25:1 to ensure that the swing arm may rotate slowly relative to the vertical table when the second hand wheel is rotated, thereby achieving fine angle adjustment.

In some embodiments, when the first locking screw is rotated, the first locking screw may push the lever to rotate around the lever rotation shaft, and the lever rotation shaft may drive the adjusting rotation shaft and the third gear to translate. When an end of the oblong hole close to the second gear is reached, the teeth of the second gear and the third gear may mesh with each other, and the second gear and the third gear cannot rotate in the same direction, thereby achieving fixation of the swing arm with respect to the vertical table.

In some embodiments, the toolface angle rotation device may be used to drive the test fixture for attitude measurement module to rotate, simulating a rotation of a drilling tool, with a rotation speed in a range of 0-500 rpm; and include a driving motor, a DC power source, a rotation speed adjustment circuit, a transmission assembly, an upper transmission shaft, a fixed outer cylinder and a second locking screw. The DC power source may be connected to the driving motor through the rotation speed adjustment circuit, and the driving motor may be mounted on a lower end of the swing arm, driving the test fixture for attitude measurement module to rotate therewith through the transmission assembly. The transmission assembly may include a motor shaft, a bevel gear pair, and a lower transmission shaft; the motor shaft and the driving motor may be connected by a universal coupling, and two gears of the bevel gear pair may be respectively mounted to the motor shaft and the lower transmission shaft, and the lower transmission shaft may be mounted to the swing arm through a bearing. The upper transmission shaft may be mounted to the fixed outer cylinder by a bearing, and the fixed outer cylinder may be clearance-fitted with the swing arm in a detachable way, and fixed with the swing arm through the second locking screw.

In some embodiments, the test fixture for attitude measurement module may comprise a rotation shaft, a circuit board mounting slot, a sensor mounting slot, and a battery mounting slot. One end of the test fixture for attitude measurement module may be mounted to the lower transmission shaft, and the other end thereof is mounted to the upper transmission shaft. Two ends of the test fixture for attitude measurement module may be connected and positioned with the toolface angle rotation device in a center-and-center fitting manner. The test fixture for attitude measurement module may be rotated under the driving of the toolface angle rotation device. In use, the second locking screw may be rotated to remove the fixed outer cylinder, and a lower center hole of the test fixture for attitude measurement module may be aligned with a center of the lower transmission shaft, and then the fixed outer cylinder may be mounted, and an upper center hole of the test fixture for attitude measurement module may be aligned with a center of the upper transmission shaft, while a pressing force may be applied axially, and the second locking screw may be rotated to tighten.

In some embodiments, the rotation speed measurement device may be configured to measure a rotation speed and a self-rotation angle of the test fixture for attitude measurement module in a rotating state, and the rotation speed measurement device may include a photoelectric encoder, a rotation speed measuring circuit, and a liquid crystal display. The photoelectric encoder may be mounted on an upper end of the fixed outer cylinder, and a measuring shaft of the photoelectric encoder may be connected to the upper transmission shaft and rotatable with the upper transmission shaft; and the rotation speed measuring circuit may count the outputs of the photoelectric encoder, calculate the rotation speed and the self-rotation angle, and display the rotation speed and the self-rotation angle on the liquid crystal display at real time or transmit the rotation speed and the self-rotation angle calculated through a communication interface.

Advantageous technical effects of the present disclosure are:

(1) the overall structure of the dynamic testing device adopts a main structure composed of a horizontal rotation plane and a vertical plane which are orthogonal to each other, so that the whole device is small in volume and stable in structure, and can be applied to dynamic testing of a heavier weight attitude measurement module.

(2) The inclination angle, the azimuth angle and the toolface angle of the dynamic testing device all can be independently adjusted, and the toolface angle may be adjusted under the driving of the motor, and the inclination angle and the azimuth angle may be manually adjusted.

(3) The swing arm fine adjustment locking device in the inclination angle swing device may realize continuous fine adjustment of the inclination angle by the unique design based on three gears having double functions of fine adjustment and locking.

(4) The swing arm in the inclined angle swing device adopts two kinds of locking devices to achieve reliable locking. One is a locking and fixing between the swing arm and the vertical table by the gear meshing action of the swing arm fine adjustment locking device, and the other is the locking and fixing between the swing arm and the auxiliary locking table by the clasp-locking device. With the double locking and fixing, it is ensured that the test fixture is not loosened and the inclination angle remains unchanged while the test fixture is rotated.

(5) The toolface angle rotation device and the test fixture may be connected in a center-and-center fitting manner, and fastened by applying a pressing force in an axial direction, having advantages of large bearing capacity (up to 30 kg), high positioning precision, good coaxiality, and adapted to high rotation speed (maximum speed 500 rpm) of the test fixture.

Figure 1:
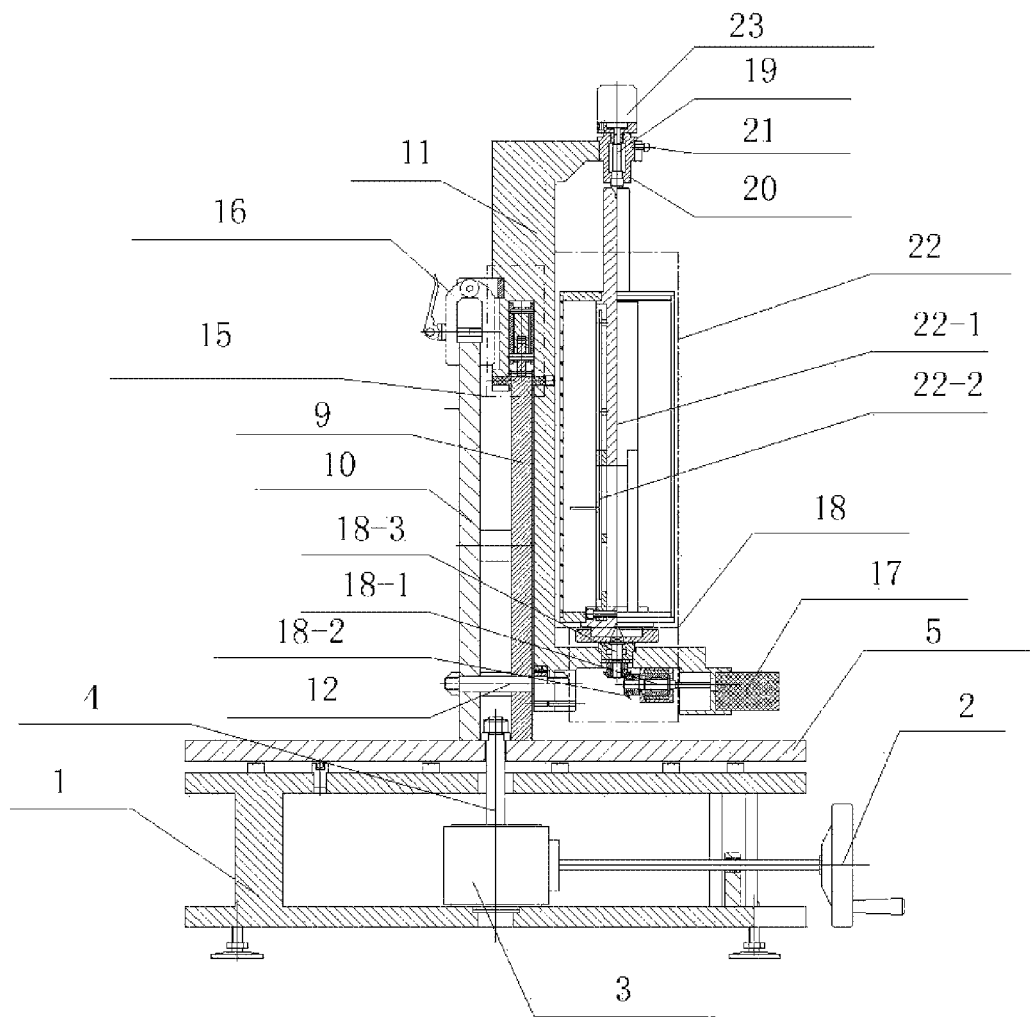
FIG. 1 is a side view of a dynamic testing device according to an embodiment of the present disclosure.

List of Reference numerals: 1. fixed base; 2. first hand wheel; 3. worm gear box; 4. main rotation shaft; 5. horizontal rotation table; 6. azimuth dial; 7. first cursor; 8. horizontal table locking device; 9. vertical table; 10. auxiliary locking table; 11. swing arm; 12. swing arm rotation shaft; 13. inclination angle dial; 14. second cursor; 15. swing arm fine adjustment locking device; 15-1. first gear; 15-2. second gear; 15-3. third gear; 15-4. second hand wheel; 15-5. first locking screw; 15-6. fixed plate; 15-7. lever; 15-8. lever rotation shaft; 15-9. adjusting rotation shaft; 16. clasp-locking device; 17. driving motor; 18. transmission assembly; 18-1. motor shaft; 18-2. bevel gear pair; 18-3. lower transmission shaft; 19. upper transmission shaft; 20. fixed outer cylinder; 21. second locking screw; 22. test fixture for attitude measurement module; 22-1. rotation shaft; 22-2. circuit board mounting slot.

DETAILED DESCRIPTION OF THE INVENTION

In order to make clear of the object, the technical solutions and advantages of the present disclosure, detailed description will be made in conjunction with embodiments and accompanying drawings. It should be appreciated that the following embodiments described are only intended to illustrate the invention, but are not intended to limit the scope of the invention.

Instead, the disclosure is intended to cover any alternatives, modifications, and equivalents within the spirit and scope of the disclosure defined in the claims. Further, in order for the public to understand the disclosure better, the specific details are described in the following description of the embodiments of the disclosure. However, the disclosure may be fully understood by those skilled in the art without description of these details.

First Embodiment

Figure 2:
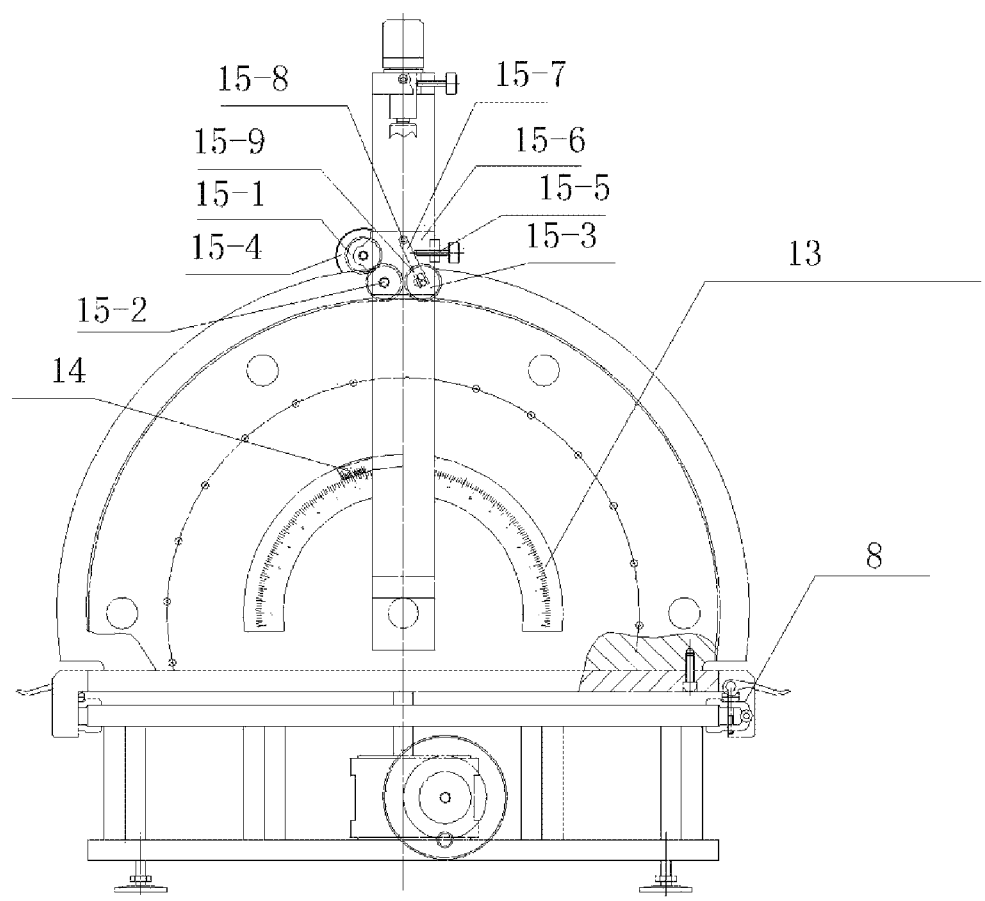
FIG. 2 is a front view of a dynamic testing device according to an embodiment of the present disclosure.
Figure 3:
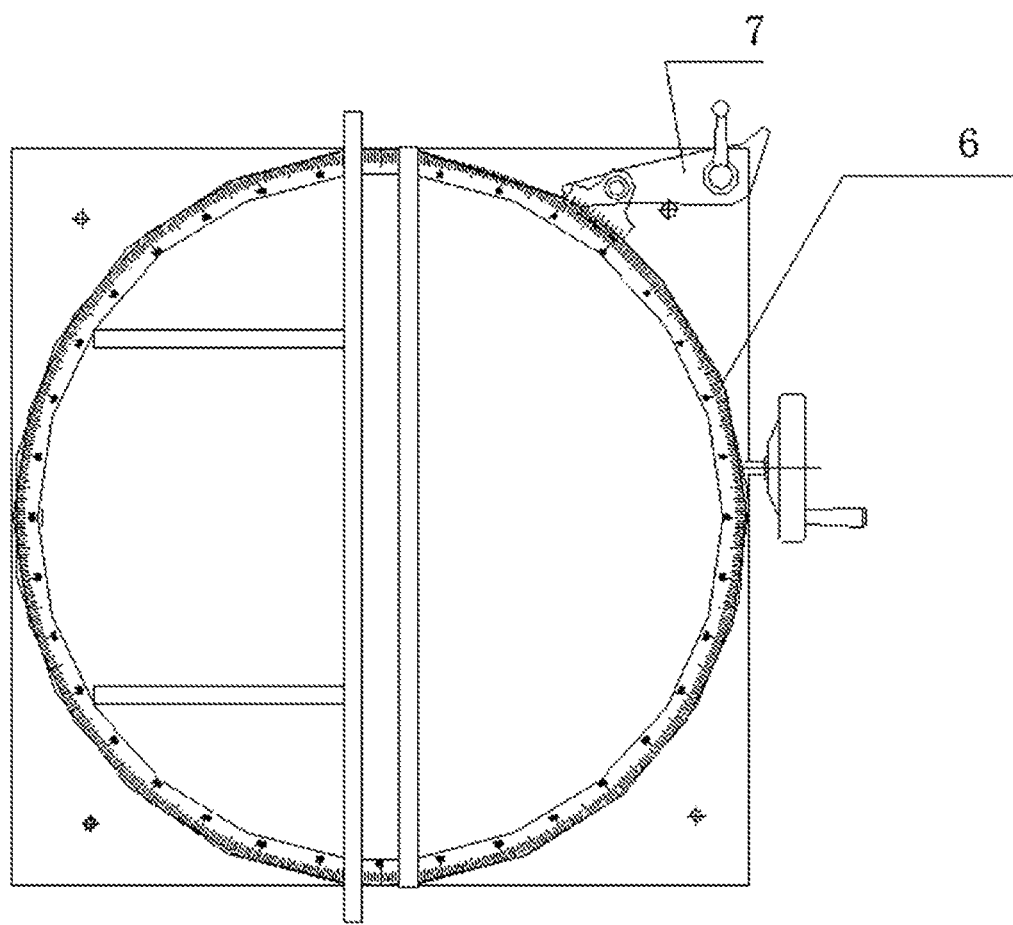
FIG. 3 is a top view of a dynamic testing device according to an embodiment of the present disclosure.

As shown in FIGS. 1-3, a dynamic testing device suitable for a drilling tool attitude measurement module may comprise a test fixture for attitude measurement module, an azimuth rotation device for adjusting an azimuth angle, and an inclination angle swing device for adjusting an inclination angle, a toolface angle rotation device for driving the test fixture for attitude measurement module to rotate, and a rotation speed measurement device for measuring a rotation speed and a self-rotation angle of the test fixture for attitude measurement module in a rotating state.

The azimuth rotation device may constitute a horizontal base of the entire dynamic testing device.

The inclination angle swing device may be mounted on the azimuth rotation device, and can rotate with the azimuth rotation device.

The toolface angle rotation device may be mounted on the inclination angle swing device, and can swing together with the inclination angle swing device.

The test fixture for attitude measurement module may be mounted on the toolface angle rotation device, and can rotate under the driving of the toolface angle rotation device.

The rotation speed measurement device may be mounted on the toolface angle rotation device for measuring the rotation speed and the self-rotation angle of the test fixture, i.e., a toolface angle.

The azimuth rotation device may adjust the azimuth angle ranging from 0° to 360°, and include a fixed base 1, a first hand wheel 2, a worm gear box 3, a main rotation shaft 4, a horizontal rotation table 5, an azimuth dial 6, a first cursor 7 and a horizontal table locking device 8.

The fixed base 1 may be used for supporting the entire dynamic testing device. The first hand wheel 2 may be mounted on the fixed base 1 and connected to the worm gear box 3 through a transmission shaft. The worm gear box 3 may serve to enable a 90 degree conversion between a direction of rotation of the hand wheel and a direction of rotation of the horizontal table while a rotation speed is reduced. The worm gear box 3 may be mounted in the middle of the fixed base 1, and the worm gear box 3 may be locked with the horizontal rotation table 5 through the main rotation shaft 4 and a nut. The horizontal rotation table 5 may be in contact with the fixed base 1 through 18 thrust bearings arranged circumferentially and evenly.

The azimuth dial 6 may be mounted on the horizontal rotation table 5, and the first cursor 7 may be mounted on the fixed base 1. The azimuth dial 6 and the first cursor 7 may cooperate to read an azimuth rotation angle. The minimum scale of the azimuth dial 6 may be 1°, and the first cursor 7 may have 10 uniform scales. The azimuth measurement accuracy may reach 0.1°. The horizontal table locking device 8 may be mounted at two ends of a diameter of the horizontal rotation table 5. A locking and fixing between the horizontal rotation table 5 and the fixed base 1 may be realized by two clasp-locking mechanisms.

In operation, the horizontal table locking device 8 may be released, and the first hand wheel 2 may be rotated to enable relative rotation between the horizontal rotation table 5 and the fixed base 1. The rotational azimuth angle may be read through the azimuth angle dial 6 and the first cursor 7. When a set azimuth angle is obtained, a rotation of the first hand wheel 2 may be stopped, and the horizontal rotation table 5 may be locked, so that the adjustment of the azimuth angle may be completed.

The inclination angle swing device may adjusts the inclination angle in a range from −90° to +90°, and include a vertical table 9, an auxiliary locking table 10, a swing arm 11, a swing arm rotation shaft 12, and an inclination angle dial 13, a second cursor 14 and a swing arm fine adjustment locking device 15.

The vertical table 9 and the auxiliary locking table 10 may both have a semi-circular structure, and be mounted on the horizontal rotation table 5 by screws. A mounting direction of the vertical table 9 and the auxiliary locking table 10 may be parallel with a 0°-180° direction line on the azimuth dial 6.

Gear teeth may be machined on an outer circumference of the vertical table 9 for cooperating with the swing arm fine adjustment locking device 15 to achieve continuous adjustment of the inclination angel of the swing arm based on gear meshing.

The swing arm 11 may be connected to the vertical table 9 through the swing arm rotation shaft 12 and a bearing, and the swing arm rotation shaft 12 may be fixedly locked to the auxiliary locking table 10 by a nut.

The inclination angle dial 13 may be mounted on the vertical table 9, and the second cursor 14 may be mounted on the swing arm 11. The inclination angle dial 13 and the second cursor 14 may cooperate to read an inclination angle.

A minimum scale of the inclination angle dial 13 may be 1°, the second cursor 14 may have 10 uniform scales, and the measurement precision for the inclination angle may reach 0.1°.

The swing arm fine adjustment locking device 15 may be mounted on an upper end of the swing arm 11 and mainly used for a locking and fixing of the swing arm 11, and include a first gear 15-1, a second gear 15-2, and a third gear 15-3, a second hand wheel 15-4, a first locking screw 15-5, a fixed plate 15-6, a lever 15-7, a lever rotation shaft 15-8 and an adjusting rotation shaft 15-9.

A rotation shaft of the first gear 15-1 may be connected with the second hand wheel 15-4, and the first gear 15-1 may be meshed with the second gear 15-2. The first gear 15-1 and the second gear 15-2 may be respectively mounted on the fixed plate 15-6 through their respective rotation shafts. The fixed plate 15-6 may be mounted to the swing arm 11 by screws. The adjusting rotation shaft 15-9 of the third gear 15-3 may be mounted in an oblong hole of the fixing plate 15-6, and the adjusting rotation shaft 15-9 can move in the oblong hole. One end of the lever 15-7 may be connected to the fixed plate 15-6 through the lever rotation shaft 15-8, and the other end thereof may be in contact with the adjusting rotation shaft 15-9 of the third gear 15-3 via a fork-type structure, and the lever 15-7 may be capable of rotating around the lever rotation shaft 15-8. The first locking screw 15-5 may be mounted to the fixing plate 15-6, and one end thereof may be in contact with the lever 15-7 through a spherical structure, and the first locking screw 15-5 can push the lever 15-7 to rotate around the lever rotation shaft 15-8 so as to push the adjusting rotation shaft 15-9 to move left and right.

The working principle of the swing arm fine adjustment locking device may be as follows. As shown in FIG. 2, when the adjusting rotation shaft 15-9 is located at an end of the oblong hole of the fixed plate 15-6 away from the second gear 15-2, teeth of the second gear 15-2 and the third gear 15-3 may be disengaged from each other, while the second gear 15-2 and the third gear 15-3 may be respectively engaged with the circumference of the vertical table 9. When the second hand wheel 15-4 is rotated, the first gear 15-1 may drive the second gear 15-2 to rotate, thereby driving the swing arm 11 to rotate around the swing arm rotation shaft 12. Meanwhile, the second gear 15-2 may have a large gear ratio with the vertical table, such that when the second hand wheel 15-4 is rotated, the swing arm 11 may rotate slowly with respect to the vertical table, thereby achieving fine adjustment of angle. When the swing arm 11 rotates, the third gear 15-3 will rotate along with the gear 2 in the same direction as the gear 2 since the third gear 125-3 is meshed with the vertical table.

When the first locking screw 15-5 is rotated, the first locking screw 15-5 may push the lever 15-7 to rotate about the lever rotation shaft 15-8, and the lever rotation shaft 15-8 may drive the adjusting rotation shaft 15-9 and the third gear 15-3 to translate. When the end of the oblong hole close to the second gear 15-2 is reached, the teeth of the second gear 15-2 and the third gear 15-3 may mesh with each other, and the second gear 15-2 and the third gears 15-3 cannot rotate in the same direction, thereby realizing the fixing of the swing arm 11 with respect to the vertical table 9. At the same time, the swing arm 11 can be locked and fixed with the auxiliary locking table 10 by the clasp-locking device 16 so as not to be loosen or change the inclination angle when rotating.

With a dynamic testing device suitable for a drilling tool attitude measurement module according to embodiments of the disclosure, a toolface angle rotation device may serve to drive a test fixture for attitude measurement module to rotate, simulating a rotation of a drilling tool, with a rotation speed in a range of 0-500 rpm. The dynamic testing device may comprise a driving motor 17, a DC power source, a rotation speed adjustment circuit, a transmission assembly 18, an upper transmission shaft 19, a fixed outer cylinder 20 and a second locking screw 21.

The DC power source may be connected to the driving motor 17 through the rotation speed adjustment circuit. The driving motor 17 may be mounted on one end of the swing arm 11 and drive the test fixture for attitude measurement module to rotate therewith through the transmission assembly 18.

The transmission assembly 18 may include a motor shaft 18-1, a bevel gear pair 18-2, and a lower transmission shaft 18-3. The motor shaft 18-1 and the driving motor 17 may be connected by a cross shaft universal coupling. Two gears of the bevel gear pair 18-2 may be respectively mounted to the motor shaft 18-1 and the lower transmission shaft 18-3, and the lower transmission shaft 18-3 may be mounted to the swing arm 11 through a bearing.

The upper transmission shaft 19 may be mounted to the fixed outer cylinder 20 by a bearing, and the fixed outer cylinder 20 may be detachably clearance-fitted with the swing arm 11 and fixed by the second locking screw 21.

With a dynamic testing device suitable for a drilling tool attitude measurement module according to embodiments of the disclosure, the test fixture for attitude measurement module 22 may comprise a rotation shaft 22-1, a circuit board mounting slot 22-2, a sensor mounting slot and a battery mounting slot for respectively mounting a circuit board, a sensor, a battery, and the like of the attitude measurement module; one end of the test fixture for attitude measurement module 22 may be mounted to the lower transmission shaft 18-3, and the other end thereof may be mounted to the upper transmission shaft 19, and both ends of the test fixture for attitude measurement module 22 may be connected and positioned with the toolface angle rotation device in a center-and-center fitting manner; the test fixture for attitude measurement module 22 may be rotated under the driving of the tool face angle rotation device. In use, the second locking screw 21 may be rotated to remove the fixed outer cylinder 20, and a lower center hole of the test fixture for attitude measurement module 22 may be aligned with a center of the lower transmission shaft 18-3, and then the fixed outer cylinder 20 may be mounted. An upper center hole of the test fixture for attitude measurement module 22 is aligned with a center of the upper transmission shaft 19, while a pressing force may be applied axially, and the second locking screw 21 may be rotated to tighten.

With a dynamic testing device suitable for a drilling tool attitude measurement module according to embodiments of the disclosure, the rotation speed measurement device 23 may serve to measure a rotation speed and a self-rotation angle of the test fixture for attitude measurement module 22 in a rotating state. The rotation speed measurement device 23 may include a photoelectric encoder, a rotation speed measuring circuit, and a liquid crystal display; the photoelectric encoder may be mounted on an upper end of the fixed outer cylinder 20, and a measuring shaft of the photoelectric encoder may be connected to the upper transmission shaft 19 and rotate therewith. The rotation speed measuring circuit may be a conventional circuit to count the outputs of the photoelectric encoder, calculate the rotation speed and the self-rotation angle, and the calculated data may be displayed on a liquid crystal display at real time, or transmitted through a communication interface.

In some embodiments of the present disclosure, the inclination angle and the azimuth angle are manually adjusted, but it is not limited to manual adjustment; instead, the inclination angle and the azimuth angle can be adjusted automatically by adding two driving motors.

Compared with the prior art, the dynamic testing devices according to the embodiments of the present disclosure may have the following advantages:

1. all the three attitude angles of the dynamic testing device for the drilling tool attitude measurement module can be adjusted, in which the azimuth angle and the inclination angle may be manually adjusted, and the toolface angle may be driven to rotate by a motor, and the rotation speed thereof can be adjusted. The testing device can be applied in situations that require calibration and testing in a rotating state.

2. The testing device has a main structure composed of a horizontal rotation plane and a vertical plane which are orthogonal to each other, which enables the whole device to have a small size and stable structure, and capable of being applied to dynamic testing of an attitude measurement module having a larger weight.

3. The testing device has the advantages of large bearing weight (30 kg), high rotation speed (maximum speed of 500 rpm) which is measurable and controllable, convenient for mounting and fixing a tested module and having a smooth rotation.

The invention claimed is:

1. A dynamic testing device suitable for a drilling tool attitude measurement module, comprising a test fixture for attitude measurement module, an azimuth rotation device, an inclination angle swing device, a toolface angle rotation device and a rotation speed measurement device, and wherein:

the azimuth rotation device is used for adjusting an azimuth angle;

the inclination angle swing device is configured to adjust an inclination angle, is mounted on the azimuth rotation device, and is rotatable with the azimuth rotation device, and an inclination angle swing plane and an azimuth rotation plane are perpendicular to each other;

the toolface angle rotation device is mounted on the inclination angle swing device, is able to swing together with the inclination angle swing device, and is used to drive the test fixture for attitude measurement module (22) to rotate;

the test fixture for attitude measurement module (22) is mounted on the toolface angle rotation device, and is able to rotate under the driving of the toolface angle rotation device; and the rotation speed measurement device is mounted on the toolface angle rotation device for measuring a rotation speed and a rotation angle of the test fixture for attitude measurement module (22) in a rotating state;

wherein the azimuth rotation device adjusts the azimuth angle in a range from 0° to 360°; and comprises a fixed base (1), a first hand wheel (2), a worm gear box (3), a main rotation shaft (4), a horizontal rotation table (5), an azimuth dial (6), a first cursor (7) and two horizontal table locking devices (8), and wherein:

the first hand wheel (2) is mounted on the fixed base (1), and is connected to the worm gear box (3) through a transmission shaft, and the worm gear box (3) is connected to the horizontal rotation table (5) through the main rotation shaft (4) and a nut, and the horizontal rotation table (5) is in contact with the fixed base (1) through thrust bearings arranged circumferentially and evenly; and the azimuth dial (6) is mounted on the horizontal rotation table (5), and the first cursor (7) is mounted on the fixed base (1), and the azimuth dial (6) and the first cursor (7) cooperate for reading the azimuth angle; and the two horizontal table locking devices (8) are respectively mounted on both ends of a diameter of the horizontal rotation table (5) for realizing a locking and fixing between the horizontal rotation table (5) and the fixed base (1).

2. The dynamic testing device of claim 1, wherein the inclination angle swing device adjusts the inclination angle in a range from −90° to +90°, and comprises a vertical table (9), an auxiliary locking table (10), a swing arm (11), a swing arm rotation shaft (12), an inclination angle dial (13), a second cursor (14), a swing arm fine adjustment locking device (15) and a clasp-locking device (16), and wherein:

the vertical table (9) and the auxiliary locking table (10) each adopt a semi-circular structure, and are vertically mounted on the horizontal rotation table (5), and a mounting direction of the vertical table (9) and the auxiliary locking table (10) is parallel to a 0°-180° direction line on the azimuth dial (6);

the swing arm (11) is connected to the vertical table (9) through the swing arm rotation shaft (12) and a bearing, and the swing arm rotation shaft (12) is fixedly locked to the auxiliary locking table (10) by a nut; gear teeth are machined on an outer circumference of the vertical table (9) for realizing continuous adjustment of the inclination angle of the swing arm based on gear meshing;

the inclination angle dial (13) is mounted on the vertical table (9), and the second cursor (14) is fixed on the swing arm (11), and the inclination angle dial (13) and the second cursor (14) cooperate to read the inclination angle; and the swing arm (11) is able to be locked and fixed with the auxiliary locking table (10) by the clasp-locking device (16), so that the test fixture for attitude measurement module does not change the inclination angle during rotation; and the swing arm (11) is able to be locked and fixed with the vertical table through an effect of gear meshing of the swing arm fine adjustment locking device (15).

3. The dynamic testing device of claim 2, wherein the swing arm fine adjustment locking device (15) is mounted on an upper end of the swing arm (11), and comprises a first gear (15-1), a second gear (15-2), a third gear (15-3), a second hand wheel (15-4), a first locking screw (15-5), a fixed plate (15-6), a lever (15-7), a lever rotation shaft (15-8) and an adjusting rotation shaft (15-9);

a rotation shaft of the first gear (15-1) is connected to the second hand wheel (15-4), and the first gear (15-1) is meshed with the second gear (15-2), and the first gear (15-1) and the second gear (15-2) are respectively mounted to the fixed plate (15-6) through their respective rotation shafts; the fixed plate (15-6) is mounted to the swing arm (11) through a screw; the adjusting rotation shaft (15-9) of the third gear (15-3) is mounted in an oblong hole of the fixed plate (15-6), and the adjusting rotation shaft (15-9) is able to move within the oblong hole.

4. The dynamic testing device of claim 3, wherein one end of the lever (15-7) is connected to the fixed plate (15-6) through the lever rotation shaft (15-8), and the other end thereof is in contact with the adjusting rotation shaft (15-9) of the third gear (15-3) through a fork-type structure, and the lever (15-7) is rotatable around the lever rotation shaft (15-8); the first locking screw (15-5) is mounted on the fixing plate (15-6), and one end of the first locking screw is in contact with the lever (15-7), and the first locking screw (15-5) can push the lever (15-7) to rotate about the lever rotation shaft (15-8), thereby pushing the adjusting rotation shaft (15-9) to move left and right.

5. The dynamic testing device of claim 4, wherein when the adjusting rotation shaft (15-9) is located at an end of the oblong hole of the fixed plate (15-6) away from the second gear (15-2), teeth of the second gear (15-2) and the third gear (15-3) are disengaged from each other while the second gear (15-2) and the third gear (15-3) respectively mesh with the teeth on the circumference of the vertical table (9); when the second hand wheel (15-4) is rotated, the first gear (15-1) drives the second gear (15-2) to rotate, thereby driving the swing arm (11) to rotate around the swing arm rotation shaft (12), and the second gear (15-2) and the vertical table have a gear ratio of 25:1 to ensure that the swing arm (11) rotates relative to the vertical table when the second hand wheel (15-4) is rotated, thereby achieving fine angle adjustment.

6. The dynamic testing device of claim 4, wherein when the first locking screw (15-5) is rotated, the first locking screw (15-5) pushes the lever (15-7) to rotate around the lever rotation shaft (15-8), and the lever rotation shaft (15-8) drives the adjusting rotation shaft (15-9) and the third gear (15-3) to translate; when the second gear (15-2) is reached, the teeth of the second gear (15-2) and the third gear (15-3) mesh with each other, and the second gear (15-2) and the third gear (15-3) cannot rotate in the same direction, thereby achieving fixation of the swing arm (11) with respect to the vertical table (9).

7. The dynamic testing device of claim 2, wherein the toolface angle rotation device is used to drive the test fixture for attitude measurement module to rotate, with a rotation speed less than or equal to 500 rpm; and includes a driving motor (17), a DC power source, a rotation speed adjustment circuit, a transmission assembly (18), an upper transmission shaft (19), a fixed outer cylinder (20) and a second locking screw (21), and wherein:

the DC power source is connected to the driving motor (17) through the rotation speed adjustment circuit, and the driving motor (17) is mounted on a lower end of the swing arm (11), and the driving motor (17) drives the test fixture for attitude measurement module to rotate therewith through the transmission assembly (18);

the transmission assembly (18) includes a motor shaft (18-1), a bevel gear pair (18-2), and a lower transmission shaft (18-3); the motor shaft (18-1) and the driving motor (17) are connected by a universal coupling, and two gears of the bevel gear pair (18-2) are respectively mounted to the motor shaft (18-1) and the lower transmission shaft (18-3), and the lower transmission shaft (18-3) is mounted to the swing arm (11) through a bearing;

the upper transmission shaft (19) is mounted to the fixed outer cylinder (20) by a bearing, and the fixed outer cylinder (20) is clearance-fitted with the swing arm (11) in a detachable way, and fixed with the swing arm (11) through the second locking screw (21).

8. The dynamic testing device of claim 7, wherein the test fixture for attitude measurement module (22) comprises a rotation shaft (22-1), a circuit board mounting slot (22-2), a sensor mounting slot, and a battery mounting slot, and wherein:

one end of the test fixture for attitude measurement module (22) is mounted to the lower transmission shaft (18-3), and the other end thereof is mounted to the upper transmission shaft (19); two ends of the test fixture for attitude measurement module (22) are connected and positioned with the toolface angle rotation device in a center-and-center fitting manner; the test fixture for attitude measurement module (22) is rotated under the driving of the toolface angle rotation device; in use, the second locking screw (21) is rotated to remove the fixed outer cylinder (20), and a lower center hole of the test fixture for attitude measurement module (22) is aligned with a center of the lower transmission shaft (18-3), and then the fixed outer cylinder (20) is mounted, and an upper center hole of the test fixture for attitude measurement module (22) is aligned with a center of the upper transmission shaft (19), while a pressing force is applied axially, and the second locking screw (21) is rotated to tighten.

9. The dynamic testing device of claim 7, wherein the rotation speed measurement device (23) includes a photoelectric encoder, a rotation speed measuring circuit, and a liquid crystal display, and wherein the photoelectric encoder is mounted on an upper end of the fixed outer cylinder (20), and a measuring shaft of the photoelectric encoder is connected to the upper transmission shaft (19) and is rotatable with the upper transmission shaft (19); and the rotation speed measuring circuit counts the outputs of the photoelectric encoder, calculates the rotation speed and the rotation angle, and displays the rotation speed and the rotation angle on the liquid crystal display at real time or transmits the rotation speed and the rotation angle calculated through a communication interface.

* * * * *